United States Patent [19]

Ammann

[11] 3,991,297
[45] Nov. 9, 1976

[54] ELECTRICALLY HEATED SOLDERING DEVICE

[75] Inventor: Hans Hugo Ammann, Chester, N.J.

[73] Assignee: Bell Telephone Laboratories, Incorporated, Murray Hill, N.J.

[22] Filed: Feb. 27, 1975

[21] Appl. No.: 553,521

[52] U.S. Cl. ............................. 219/233; 156/583; 219/85 D; 219/228; 219/235; 219/243; 228/51
[51] Int. Cl.² ..................... H05B 3/00; B23K 3/02
[58] Field of Search ............ 219/221, 227, 228, 230, 219/233, 235, 243, 85 D, 85 R; 228/51–55; 156/583

[56] References Cited
UNITED STATES PATENTS

| | | | |
|---|---|---|---|
| 2,618,728 | 11/1952 | Bram | 219/243 |
| 2,620,427 | 12/1952 | Mickel | 219/243 |
| 3,095,492 | 6/1963 | Gaiennie | 219/243 |
| 3,113,198 | 12/1963 | Shinn | 219/243 X |

FOREIGN PATENTS OR APPLICATIONS

| | | | |
|---|---|---|---|
| 243,985 | 2/1947 | Switzerland | 219/228 |
| 412,133 | 11/1966 | Switzerland | 219/243 |

*Primary Examiner*—A. Bartis
*Attorney, Agent, or Firm*—J. S. Cubert

[57] ABSTRACT

A tool adapted to simultaneously heat a plurality of spaced electrical elements for soldering includes a rigid low conductivity metallic strip connected between and holding first and second relatively massive high conductivity bars in spaced, parallel relation. The lower portion of the elongated metallic strip is shaped to extend from the bars and contact the elements to be soldered. Electrical current is applied between one end of the first bar and the opposite end of the second bar and is directed through a metallic strip transverse to the elongated dimension. Upon discontinuation of the electrical current, the relatively massive bars rapidly remove heat from the metallic strip.

4 Claims, 4 Drawing Figures

ELECTRICALLY HEATED SOLDERING DEVICE

BACKGROUND OF THE INVENTION

My invention relates to selective heating apparatus and more particularly to heating apparatus for soldering a plurality of spaced electrical elements.

Soldering has long been used for joining electrical elements in electronic apparatus. More recent developments in electronic circuit techniques have required arrangements for simultaneously soldering a large number of spaced electrical terminations, such as connector elements, flat, flexible cable and flexible circuits. One method for such batch soldering involves placing a soldering tool in contact with the surface of previously solder-coated spaced terminal members. Radiant energy is focused on the tool, which is heated thereby and the tool is transferred to the solder-coated members to cause solder flow. The solder operation is accomplished after cooling of the solder. The conversion of energy to radiant form and then to heat, however, is relatively inefficient and the apparatus for the conversion is generally large and bulky, whereby the radiant energy techniques is not readily adaptable for use in high density electronic equipment.

Another arrangement for batch soldering uses a relatively long slender bar or wire which is placed in contact with the line of spaced terminal members to be soldered after the bar is heated by means of an electrical current directed longitudinally along the length of the slender bar. Although the heat is generated in close proximity with the surfaces to be soldered, the variations in resistivity along the slender bar produce unwanted variations in temperature. Additionally, high resistivity in a portion of the slender bar produces temperature instability problems which limit the length of the bar that may be used. Generally, a bar length of one to two inches is suitable. Longer slender bars result in tool failure or large gradients in temperature. Although the cross section of the slender bar may be varied to reduce large variations in temperature, the instability problems are inherent in the slender bar geometry. Consequently, only a limited number of spaced electrical terminations can be soldered in each operation. Presently, batch soldering of spaced electrical terminations may require a uniform temperature over a length of six or more inches, in which event the slender bar soldering tool is inadequate. It is therefore an object of the invention to provide economic apparatus for simultaneously and uniformly heating a large number of spaced electrical elements to provide soldered connections.

SUMMARY OF THE INVENTION

The invention is a device for concurrently heating a plurality of spaced elements to form a plurality of solder joints. A heat generating member of the device is dimensioned to contact the plurality of spaced elements along its length and said member is connected all along its length between a pair of relatively massive conductive bars. Energy is supplied to the heat generating member transverse to its length through the bars and the heat from said member is simultaneously transmitted to all spaced elements. After solder flow in the elements, the energy supply is discontinued and the heat is rapidly removed from the heat generating member by the relatively massive conductive bars.

According to one aspect of the invention, electrical current is applied to the conductive bars and is directed therefrom through the heat generating member in a direction transverse to the length thereof, whereby said heat generating member is uniformly heated along its length.

According to another aspect of the invention, a power source supplying electrical current is connected to one end of the first of said bars and to the opposite end of the second of said bars to assure to a uniform distribution of current in the heat generating member.

According to yet another aspect of the invention, the heat generating member comprises an elongated metal strip having first and second sides and a lower portion between said sides. Each bar is an elongated, relatively massive and highly conductive member. The bars are placed in spaced parallel relation in said elongated dimension and the sides of the metal strip are connected to the bars all along the length of the strip whereby an electrical path is formed transverse to the length of the heat generating metal strip.

According to yet another aspect of the invention, the heat generating member comprises a rigid elongated U-shaped metal strip of relatively narrow thickness having relatively low electrical conductivity. Each bar is an elongated metallic member of relatively large cross section having relatively high thermal and electrical conductivity. The bars are placed in spaced parallel relation in said elongated dimension. The vertical sides of the U-shaped low conductivity strip are bonded to the parallel spaced bars along the length of the U-shaped strip whereby an electrical path is formed through the bars transverse to the length of the heat generating member.

According to yet another aspect of the invention, each bar has a relatively massive rectangular cross section, and the vertical sides of the U-shaped low conductivity strip are brazed to the vertical sides of the spaced parallel bars.

According to yet another aspect of the invention, the conductive bars comprise elongated members of circular cross section in spaced parallel relation and the low conductivity heat generating member comprises a rigid V-shaped metallic strip of narrow cross section at the V-joint. The diagonal sides of the V-shaped strip are joined to the lower portions circular cross-section bars all along the length thereof, whereby an electrical path is formed through the bars and the heat generating member, which path is transverse to the length of the V-shaped metallic strip.

DETAILED DESCRIPTION

Figure 1:
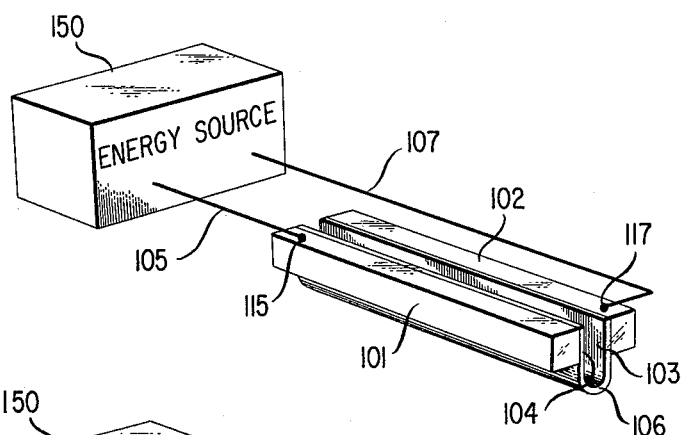
FIG. 1 is a perspective view of one embodiment illustrative of the invention.

Referring to FIG. 1, the soldering tool shown therein comprises conductive bar 101 which is placed in spaced parallel relation with conductive bar 102. Each conductive bar is an elongated rectangular cross-section bar having high thermal and electrical conductivity. An elongated heating member or arcuate U-shaped cross section is disposed between bars 101 and 102. Side 104 of the U-shaped heating member is connected to bar 101 all along its length, and side 103 of the U-shaped heating member is similarly connected all along its length to bar 102. The U-shaped member is formed from a strip of relatively low electrical conductive metal such as stainless steel which is advantageously corrosion resistant and non wettable. Bars 101 and 102 are relatively massive compared to the U-shaped strip and are formed from a relatively high thermal and electrical conductivity metal such as copper. The bonding between side 104 and bar 101 and side 103 and bar 102 may be made by brazing or other techniques well known in the art to provide a low thermal and electrical resistance connection all along the length of the heating member strip. The thickness of the U-shaped member is limited to provide a relatively high resistance with respect to bars 101 and 102, but the thickness is sufficient to provide a rigid structure.

Energy source 150 supplies electrical current to bars 101 and 102 through conductors 105 and 107. Conductors 105 is connected to one end of bar 101 at point 115 and conductor 107 is connected to the opposite end of bar 102 at point 117. A continuous electrical path is provided through bar 101, heat generating member 106, and bar 102, whereby the electrical current from source 150 flows through bar 101, heating member 106 transverse to its elongated dimension, and bar 102. The relatively high resistance of the U-shaped heating strip causes the heating thereof responsive to the application of electrical energy to bars 101 and 102. The heating effect in bars 101 and 102 is minor due to the high conductivity thereof. The transverse flow of current through metal strip 106 ensures uniform temperature distribution therein, since any region of high resistivity in the U-shaped strip causes the applied current to flow around the region. In the prior art long slender bar arrangement, the longitudinally applied current in a region of high resistivity causes heat to be concentrated therein and results in a nonuniform temperature distribution. Thus, the transverse flow of current through the metal strip 106 of FIG. 1 allows the strip to be of any convenient length, whereas the slender bar is limited in length.

In operation, the lower portion of the U-shaped strip is placed in contact with the surface of the work pieces to be soldered. Electrical current is then supplied to the soldering tool from source 150. The transverse current flow in metal strip 106 uniformly heats the U-shaped strip to a temperature sufficient for soldering. The pressure of the lower portion of the U-shaped strip holds the work pieces in place. Upon solder flow, current from energy source 150 is discontinued and the heat in metal strip 106 is rapidly transferred to the relatively massive, highly conductive copper bars 101 and 102. In this way, the metal strip and the work pieces in contact therewith are rapidly cooled to form the plurality of solder bonds along the length of the metal strip. The work pieces may comprise a pair of flexible cables, a cable and a connector, or a cable and a printed circuit board.

Figure 2:
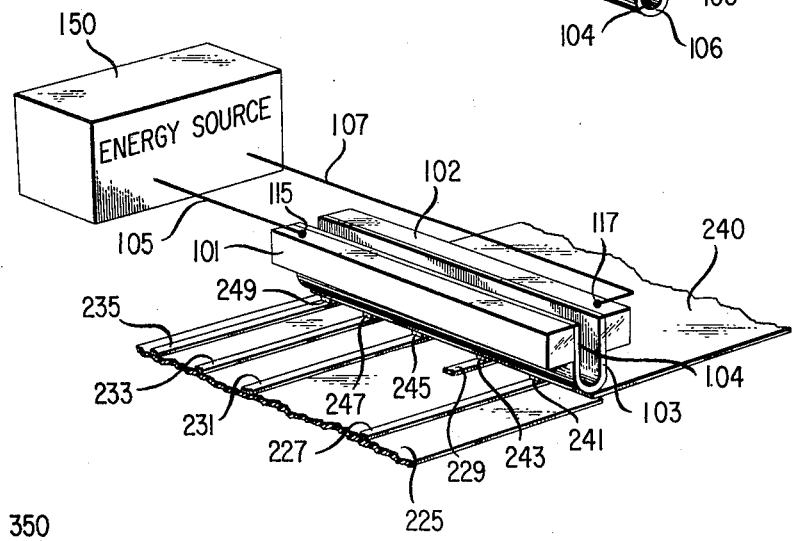
FIG. 2 shows the embodiment of FIG. 1 in position for soldering a plurality of circuit conductors.

In FIG. 2, work piece 225 may be a flat flexible cable comprising a plurality of parallel conductors 227, 229, 231, 233 and 235, the ends of each of the parallel conductors having a solder coating. Work piece 240 comprises a similar group of parallel conductors 241, 243, 245, 247, and 249. The conductors of work piece 225 are arranged to mate with the conductors of work piece 240. Work piece 225 is placed into overlapping contact with work piece 240 so that conductor 227 contacts conductor 241, conductor 229 contacts conductor 243, conductor 231 contacts conductor 245, conductor 233 contacts conductor 247, and conductor 235 contacts conductor 249. After having the solder tool placed in contact with the overlapping work pieces, electrical current is supplied to bar 101 via lead 105 and to bar 102 via lead 107.

Lead 105 is connected to bar 101 at point 115, while lead 107 is connected to bar 102 at point 117. U-shaped metal strip 106 is connected between bars 101 and 102 all along its length, whereby the U-shaped member completes the electrical path between bars 101 and 102. Electrical current is distributed along the length of bars 101 and 102 and flows transversely through the U-shaped member connected therebetween. By applying the current from source 150 at opposite ends of bars 201 and 202, a more uniform distribution of current along the length of U-shaped member 106 is attained.

The relatively high resistance U-shaped member causes it to be heated. The lower portion of U-shaped member 106 is placed into contact with overlapping work pieces 225 and 240. Current applied to bars 101 and 102 cause the relatively high resistannce U-shaped member to be heated and the heat is transmitted from the U-shaped member to each of the overlapping conductors of the work pieces. The work pieces are held in place by the rigid U-shaped member. When sufficient solder flow occurs, energy source 150 is disabled to stop the current flow in the U-shaped member. Because of the relatively large mass and high thermal conductivity of bars 101 and 102, the heat from the work pieces and the U-shaped member is rapidly transferred to the bars to cool the solder bonds between the joined parallel conductors. Since, as aforementioned, the transverse flow of current through the U-shaped member provides a uniform temperature distribution at the contact line between the U-shaped member and the work pieces, the length of the U-shaped member is not restricted and any convenient number of conductors can be simultaneously soldered.

Figure 3:
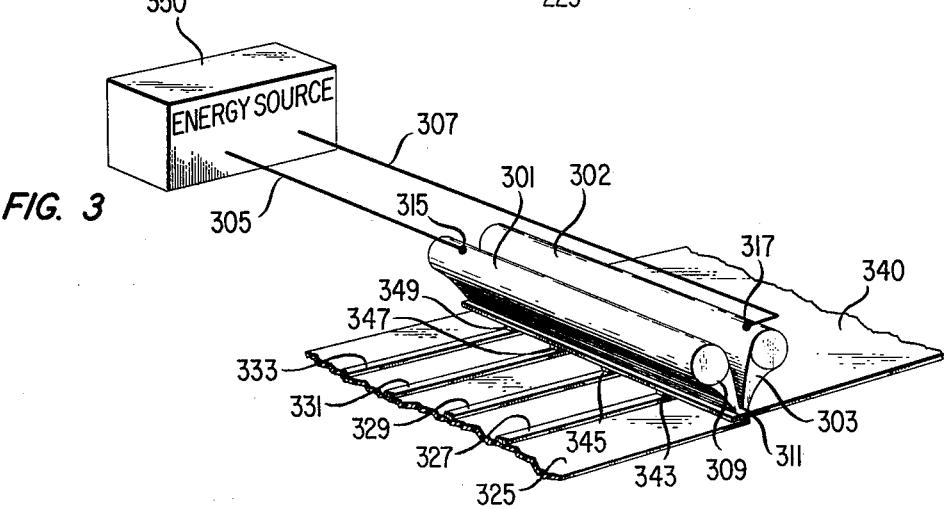
FIG. 3 shows another embodiment illustrative of the invention in position for soldering a line of circuit conductors.

The soldering tool of FIG. 3 comprises circular cross-section elongated bars 301 and 302. These bars are of a high thermal and electrical conductivity material so that they are not heated responsive to the flow of electrical current therethrough and so that they provide the heat sinking arrangement for the solder tool. The V-shaped heat generating member is connected between bars 301 and 302. The heat generating member comprises tapered diagonal sides 303 and 309 and a narrow V-joint 311. The tapered V-shape provides maximum heating along V-joint 311, and the thickness of the V-shaped member is selected so that the resistivity in the vicinity of V-joint 311 is relatively high. The V-shaped member is composed of a corrosion-resistant, nonwettable metal such as stainless steel, which provides a rigid structure for pressure contacting work pieces.

Work piece 325 comprises a group of parallel conductors 327 through 333, while work piece 340 comprises a similar group of parallel conductors 343 through 349. The work pieces are placed in alignment so that mating conductors overlap and solder is placed between mating conductors, e.g., 327 and 343. Bars 301 and 302 and the V-shaped heating member connected therebetween form an electrical path having low resistivity in the bars and relatively high resistivity at line 311. Electrical energy is supplied to bar 301 at point 315 via lead 305 and to bar 302 at point 317 via lead 307. The geometry of the electrical path formed by the bars and the V-shaped member assures uniform current flow along V-joint 311. The transverse current flow through the V-shaped member provides a uniform temperature all along V-joint 311 and at each of the mated electrical conductors of work pieces 325 and 340. V-joint 311 of the V-shaped member is placed in contact with overlapping work pieces 325 and 340. The V-shaped heat generating member is then heated by energy source 350 until an appropriate soldering temperature is attained. In this manner the heat along V-joint 311 is transmitted to the junctions of the parallel overlapping electrical conductors. After solder flow occurs, source 350 is turned off and the V-shaped member is rapidly cooled by transfer of heat therefrom to the relatively massive, high conductivity bars 301 and 302. In this manner, rapid cooling of the solder joints at the overlapping conductors is assured.

Figure 4:
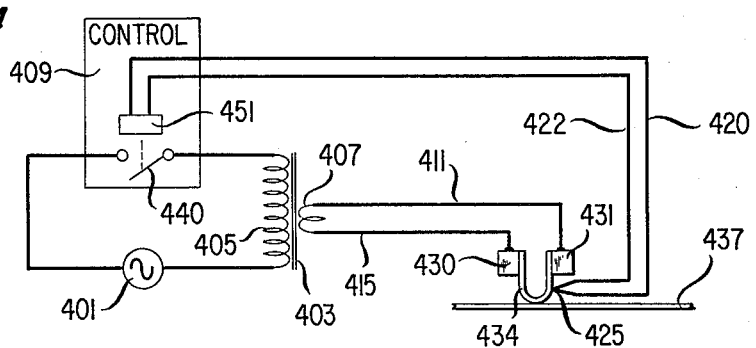
FIG. 4 shows a schematic diagram of a soldering tool in accordance with the invention and thermostatic control thereof.

FIG. 4 shows an arrangement for controlling the temperature at work piece 237 during a batch soldering operation. The solder tool in FIG. 4 is shown in cross section and comprises bars 430 and 431 and a U-shaped heating member 434. AC source 401 provides the electrical energy for the soldering tool through step-down transformer 403. Current is secondary 407 responsive to the electrical energy from source 401 is transmitted through lead 411, transversely through the electrical path comprising bar 431, heat generating U-shaped member 434, and bar 430, and through lead 415. Thermocouple 425 monitors the temperature at the heat generating member and develops a potential which is transmitted to control 409 via leads 420 and 422. When the temperature is below that required for soldering, contact 440 is in its closed position, whereby current is supplied to heat generating member 434. Upon the heat generating member attaining the required temperature, the potential applied to circuit 451 causes contact 440 to be opened. Circuit 451 may comprise any well-known electronic circuit responsive to changes in potential to control the position of a high current contact such as an amplifier driving a solenoid.

While the invention has been shown and described with reference to particular embodiments thereof, it is to be understood that numerous changes may be made in form and details without departing from the spirit and scope of the invention. For example, an auxiliary water cooling arrangement may be provided by a duct in each elongated bar through which ducts a cooling fluid flows after melting of solder.

What is claimed is:

1. A device for heating a plurality of linearly spaced elements comprising first and second electrically and thermally conductive elongated bars; a rigid, relatively lower conductivity, elongated metallic strip holding said first and second bars in spaced, substantially parallel relation comprising a first side joined to said first bar all along its elongated dimension, a second side joined to said second bar all along its elongated dimension and a lower portion joining said first and second sides and protruding from said bars for simultaneously contacting said plurality of linearly spaced elements along its elongated dimension, an electrical current source, and means for applying electrical current from said source to said bars comprising a first electrical connection at one end of said first bar and a second electrical connection at the opposite end of said second bar, said bars and said rigid metallic strip forming an electrical current path transverse to the elongated dimension of said rigid metallic strip to uniformly heat the elongated contact area of said lower portion, each of said bars comprising a relatively massive bar with respect to said strip for rapidly cooling said metallic strip on discontinuance of said electrical current.

2. A device for heating a plurality of linearly spaced elements comprising first and second elongated, thermally and electrically conductive bars, an elongated, rigid, self-supporting, electrically conductive metal strip holding said first and second bars in spaced, substantially parallel relation comprising a first diagonal side joined all along its elongated dimension to said first bar, a second diagonal side joined all along its elongated dimension to said second bar, and a V-joint at the intersection of said diagonal sides for contacting said plurality of linearly spaced elements, means for directing electrical current through said bars and said metal strip in a direction transverse to the elongated dimension of said metal strip, said frist and second bars each comprising a relatively massive bar in relation to said metal strip for rapidly removing heat from said joined metal strip upon cessation of said electrical current.

3. A device according to claim 2 wherein each of said first and second bars comprises an elongated circular cross-section bar, said first diagonal side comprising a tapered cross-section diagonal side having a wide portion joined all along its elongated dimension to the lower portion of said first circular cross-section bar, said second diagonal side comprising a tapered cross-section diagonal side having a wide portion joined all along its elongated dimension to the lower portion of said second circular cross-section bar, said first and second tapered diagonal sides forming a narrow cross section at said V-joint.

4. A soldering tool for heating a line of spaced electrical conductors comprising first and second elongated, high thermal and electrical conductivity, circular cross-section bars, a rigid, self-supporting, elongated metal strip of lower conductivity holding said first and second bars in closely spaced, substantially parallel relation comprising a first tapered diagonal side having a wide end bonded all along its elongated dimension to the lower portion of said first circular cross-section bar, a second tapered diagonal side having a wide end bonded all along its elongated dimension to the lower portion of said second circular cross-section bar, a narrow cross-section V-joint at the intersection of said first and second tapered diagonal sides for contacting said line of spaced electrical conductors, means for directing electrical current through said bars and said metal strip in a direction transverse to the elongated dimension of said metal strip, said first and second bars each comprising a relatively massive bar in relation to said metal strip for rapidly removing heat from said metal strip upon discontinuance of said electrical current.

* * * * *

UNITED STATES PATENT AND TRADEMARK OFFICE
CERTIFICATE OF CORRECTION

PATENT NO. : 3,991,297
DATED : November 9, 1976
INVENTOR(S) : Hans Hugo Ammann

It is certified that error appears in the above-identified patent and that said Letters Patent are hereby corrected as shown below:

Column 1, line 18, after "tool" insert --heat--; line 24, "techniques" should be --technique--. Column 3, line 48, "surface" should read --surfaces--. Column 6, line 27, "frist" should read --first--.

Signed and Sealed this

Third Day of May 1977

[SEAL]

Attest:

RUTH C. MASON
Attesting Officer

C. MARSHALL DANN
Commissioner of Patents and Trademarks